United States Patent [19]

Hale

[11] Patent Number: 5,337,985
[45] Date of Patent: Aug. 16, 1994

[54] SUPPORT DEVICE FOR A LAPTOP COMPUTER

[76] Inventor: Alan P. Hale, 12315 Steeple La., Houston, Tex. 77039

[21] Appl. No.: 28,938

[22] Filed: Mar. 5, 1993

[51] Int. Cl.$^5$ .......................................... A45D 19/04
[52] U.S. Cl. .................................... 248/174; 248/146; 248/205.2; 248/176; 248/676; 248/918
[58] Field of Search ............... 248/174, 146, 176, 918, 248/205.2, 676

[56] References Cited

U.S. PATENT DOCUMENTS

| | | |
|---|---|---|
| 4,044,980 | 8/1977 | Cummins . |
| 4,073,460 | 2/1978 | Dale ................. 248/174 X |
| 4,577,788 | 3/1986 | Richardson ........................ 224/273 |
| 4,610,054 | 9/1986 | Malian ................. 24/67 R |
| 4,830,328 | 5/1989 | Takach, Jr. ...................... 248/639 |
| 4,846,382 | 7/1989 | Foultner et al. ............... 224/42.42 |
| 4,856,748 | 8/1989 | Obermeyer ........................ 248/688 |
| 5,085,153 | 2/1992 | McKee ................. 108/44 |
| 5,141,196 | 8/1992 | Arnold et al. ...................... 248/397 |
| 5,149,051 | 9/1992 | Schriner ........................ 248/174 X |
| 5,154,391 | 10/1992 | Hegarty ........................ 248/205.2 X |

*Primary Examiner*—Ramon O. Ramirez
*Attorney, Agent, or Firm*—Harrison & Egbert

[57] ABSTRACT

A support device for a laptop computer having a first panel, a second panel, and a fastener affixed to end of at least one of the first and second panels. The second panel is connected to the first panel and angularly displaced by approximately ninety degrees therefrom. The fastener allows the panels to be removably attached to a bottom surface of the laptop computer. The fastener is a strip of hook-and-loop material which is affixed to an end of the first panel. The hook-and-loop material can also be attached to an end of the second panel opposite the connection with the first panel. The strips of hook-and-loop material are received by complementary strips of hook-and-loop material affixed to the bottom surface of the laptop computer.

14 Claims, 2 Drawing Sheets

SUPPORT DEVICE FOR A LAPTOP COMPUTER

TECHNICAL FIELD

The present invention relates to laptop computers, in general. More particularly, the present invention relates to support devices that can be used to angularly position a laptop computer above a base surface.

BACKGROUND ART

In recent years, there has been a tremendous growth in the sale of laptop computers and notebook computers. Laptop computers are very useful instruments which essentially present a computer to the user in a convenient compact fashion. Typically, the screen of the laptop computer is a liquid crystal display. The screen of the computer can fold upon the body of the computer so as to close when not in use. When the computer is in use, the screen is folded about its hinges so as to face the user. The bottom surface of the computer is typically placed on a table, on a lap, or other flat surface. Various devices such as power supplies, modems, external drives, and other items can also be connected to the laptop computer so as to enhance the use of the laptop computer.

Unfortunately, the design of the laptop computer is optimized for compactness and convenience. The laptop computer is not necessarily designed for optimum ergonomic efficiency. When the computer is placed on a flat surface, the screen of the computer often does not face the user directly. As such, the user of the computer must slouch or otherwise manipulate the screen so as to be in an optimal viewing position. The screen at this angle can also reflect an undesirable glare from overhead lighting. Additionally, unlike typewriter keyboards, the keyboard of a laptop computer rests in parallel relationship to the base surface. This is often inconvenient for typing purposes. It would be preferable if the keyboard could be placed at an angle to the base surface so as to allow the keys to be easily viewed and for the fingers of the user to properly manipulate the keys. It is an additional problem with the laptop computer that the internal circuitry must be continually cooled so as to preserve the long life of the computer. Air must circulate through the circuitry so as to carry out this cooling purpose. However, because the bottom surface of the computer rests against a flat base surface, it is very difficult to achieve the optimum air flow. As such, the laptop computer must operate at relatively high temperatures. Such temperatures will ultimately reduce the life of the laptop computer.

In the past, various patents have issued on devices that can be used to support a calculator or computer above a surface. U.S. Pat. No. 4,830,328, issued on May 16, 1989, to Takach et al. describes a portable computer system which includes a plate assembly so as to provide a support for the power supply external to the computer and a foot for disposing the computer in a desired position. The plate assembly includes a first plate to which the computer is attached, a second plate to which the power supply is attached, and a hinge coupling the first and second plates together. The hinge allows the plates to be in substantially planar alignment or at an angle to each other to permit the second plate to function as a foot for the computer.

U.S. Pat. No. 4,856,748, issued on Aug. 15, 1989, to M.W. Obermeyer discloses a leg assembly for a keyboard. This leg assembly is movable between two stable positions; the first position being a retracted position and the second position being a deployed position. The leg assembly is comprised of a leg which is pivotally mounted to a keyboard by means of a pin.

U.S. Pat. No. 5,141,196, issued on Aug. 25, 1992, to Arnold et al. shows a support for a keyboard. The support can be mounted either on a generally horizontal surface, such as a table, or on an upper surface of a printer, or on a vertical surface, such as a wall. The support is adjustable so the keyboard can be positioned at different inclinations. A frame is provided which hingedly connects one plate to another plate. A suitable hinge pin is provided so as to create the angular displacement between the plates.

U.S. Pat. No. 4,044,980, issued on Aug. 30, 1977, to V. Cummins discloses a one-piece collapsible stand formed of a flexible plastic material, such polypropylene. This stand holds a portable electronic calculator. The stand is capable of a plurality of selectable inclined positions on a desk top. The stand has a rectangular base platform having a back rest adapted to hold the calculator. The back rest is joined to one end of the base by a thin integral web and a base plate for supporting the back rest in an inclined position. The base plate is joined to the opposite end of the base by a similar integral web. The back rest and the base plate swing about the opposite ends of the base platform between an assembled state in which they releasably engage each other above the base platform and a collapsed state in which the back rest, the base platform and the base plate are held substantially flat against one another.

It is an object of the present invention to provide a support device for a laptop computer that places the keyboard of the laptop computer in a convenient location for use and enhances screen visibility.

It is another object of the present invention to provide a support device for a laptop computer that allows air to circulate through the back surface of the computer body.

It is a further object of the present invention to provide a support device for a laptop computer which is detachably connected to the bottom surface of the laptop computer.

It is still a further object of the present invention to provide a support device for a laptop computer which is highly portable, being of a minimal weight and size, easy to use, conveniently stowed, simple to manufacture, and relatively inexpensive.

These and other objects and advantages of the present invention will become apparent from a reading of the attached specification and appended claims.

SUMMARY OF THE INVENTION

The present invention is a support device for a laptop computer that comprises a first panel, a second panel connected to the first panel and angularly displaced therefrom, and a fastener affixed to an end of at least one of the panels. The fastener is for the removable attachment of the panels to a surface of the laptop computer.

The first panel is integrally formed with the second panel in a generally V-shaped configuration. The first panel is angularly offset from the second panel by approximately ninety degrees. The first panel has an end opposite the connection with the second panel. The fastener is affixed to that end. Similarly, the second panel has an end opposite the connection with the first panel. Another fastener may also be affixed to that end of the second panel.

The fastener includes a first section of hook-and-loop material which is suitable for attachment to a complementary section of hook-and-loop material on a bottom surface of the laptop computer. The first section of hook-and-loop material is wrapped around an end of the first panel. A second section of hook-and-loop material is wrapped around the end of the second panel. Another strip of hook-and-loop material may be affixed to an inner surface of the V-shaped configuration of the first and second panels adjacent to the connection of the first panel and second panels. The first and second panels are made of a polymeric material.

The present invention is also an improved laptop computer. The laptop computer has a bottom surface with a pair of hook-and-loop material strips affixed near the two corners at one end of the laptop computer opposite to the keyboard of the laptop computer. Each of these strips is aligned in parallel relationship. One of the strips is adjacent to the end of the laptop computer. The other of the strips is placed in parallel relationship inwardly from that end. A pair of V-shaped members are provided with complementary hook-and-loop material strips affixed about their ends. These complementary hook-and-loop material strips engage the strips fastened to the bottom surface of the laptop computer. The V-shaped members extend downwardly so as to support the bottom surface of the laptop computer at an angle with respect to a base surface.

DETAILED DESCRIPTION OF THE INVENTION

Figure 1:
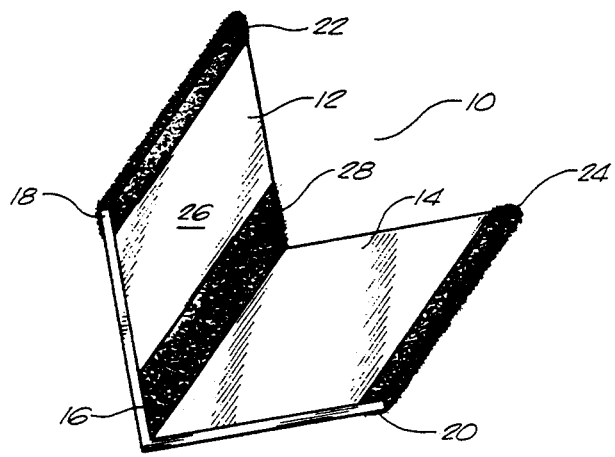
FIG. 1 is a perspective view of the support device in accordance with the preferred embodiment of the present invention.

Referring to FIG. 1, there is shown at 10 the support device in accordance with the preferred embodiment of the present invention. The support device 10 includes a first panel 12, and a second panel 14. The second panel 14 is connected along edge 16 to the first panel 12. The second panel 14 is angularly displaced from the first panel 12 by approximately ninety degrees. As can be seen, the arrangement of the first panel 12 with the second panel 14 forms a generally V-shaped configuration. The support device 10 of the present invention is otherwise identified herein as a V-shaped member.

The first panel 12 is integrally formed with the second panel 14 in the V-shaped configuration. The first and second panels are formed of a polymeric material. The first panel 12 has an end 18 opposite the connecting edge 16 with the second panel 14. Similarly, the second panel 14 has an end edge 20 opposite the connecting edge 16 with the first panel 12.

In the present invention, a fastener 22 is affixed to the end 18 of the first panel 12. The fastener 22 allows the support device 10 to be removably attached to a surface of a laptop computer. The fastener 22 is a strip of hook-and-loop material, otherwise known as VELCRO (TM). The hook-and-loop material 22 is wrapped around and over the end 18 of the first panel 12 for secure attachment. The strip of hook-and-loop material 22 may be affixed to end 18 by adhesives or by other techniques. Within the concept of the present invention, it is only important that the hook-and-loop material 22 extends outwardly beyond the end 18 of the first panel 12.

A second strip of hook-and-loop material 24 is affixed to the end 20 of the second panel 14. This strip of hook-and-loop material 24 has a configuration similar to that of first strip 22. The hook-and-loop material of strip 24 is wrapped around the end 20 of the second panel 14 so as to extend outwardly therefrom. The strip 24 can be affixed to the end 20 by adhesives, or other means.

The first panel 12 has an inner surface 26 formed on the side of the narrow angle between the first panel 12 and the second panel 14. A third strip 28 of hook-and-loop material may be formed or positioned on the inner surface 24 adjacent to the connecting edge 16 between the first panel 12 and the second panel 14. This strip 28 extends across the surface of the first panel 12. The strip 28 may be affixed to the surface 26 by adhesives, or by other means.

As with most hook-and-loop material, there will be a section of loop material which is suitable for the joining with the section of hook material. Within the scope of the present invention, it is unimportant whether the strips 22, 24, or 28 are of the loop variety. In use, the strips 22, 24, and 28 will join with complementary strips positioned on the bottom surface of a laptop computer. For example, if strip 22 is of the "hook" variety, then the strip 22 will join with a strip of "loop" material positioned on the bottom surface of the laptop computer.

In the simplest embodiment of the present invention, it is only necessary that one of the ends 18 or 20 have the strip of hook-and-loop material thereon. However, in the preferred embodiment of the present invention, each of the ends 18 and 20 will have the strips 22 and 24 thereon.

Figure 2:
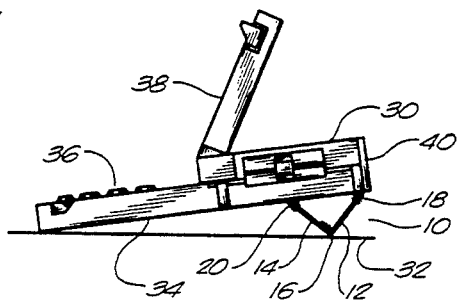
FIG. 2 is a side elevational view showing the improved laptop computer of the present invention.

FIG. 2 illustrates the manner in which the support device 10 is positioned so as to allow the laptop computer 30 to be positioned in a proper location above a base surface 32. As can be seen, the support device 10 is a V-shaped member which has end 18 and end 20 affixed to the bottom surface 34 of the laptop computer 30. These ends 18 and 20 extend downwardly along panels 12 and 14 to a supporting corner or edge 16. The positioning of the support device 10 causes the bottom surface 34 to extend above the base surface 32 at an acute angle. This allows the keyboard 36 of laptop computer 30 to be at an easier angle for usage. Similarly, the screen 38 is positioned so as to be more easily viewable by the user of the laptop computer 30. As can be seen, the VELCRO (TM) strip 22 affixed to the end 18 of panel 12 and the VELCRO (TM) strip 24 affixed to the end 20 of panel 14 are fastened to complementary strips attached to the bottom surface 34 of laptop computer 30. The support device 10 is positioned generally adjacent to the end 40 of the laptop computer. This arrangement allows for the proper balancing of the laptop computer during use.

As used herein, the term "laptop computer" can include various types of small portable computers. For example, the term "laptop computer" can include laptops, notebook and sub-notebook computers, palm-top computers, word processors, pocket computers and electronic organizers, and micro computers, as well as keyboards and keyboard substitutes such as keypads and electronic writing and drawing pads for pen-based computing.

It can be further seen in FIG. 2 that the positioning of the support device 10 keeps the body of the laptop computer suspended a desired distance above surface 32. As was stated previously, the circuitry of the laptop computer requires a sufficient air flow for cooling effect and for the purposes of preserving the long life of the laptop computer 30. When the bottom surface 34 of the laptop computer 30 rests flush against the base surface 32, the air flow through the computer is effectively blocked. This causes the laptop computer 30 to operate at higher temperatures than desired. However, by placing the support device 10 adjacent to the back 40 of laptop computer 30, the bottom surface 34 of the laptop computer is arranged in a position in which air flow can easily pass through the computer 30. As such, in addition to the ergonomic efficiency of the present invention, the support device 10 provides the unexpected benefit of enhancing air flow and for preserving the long life of the laptop computer 30.

Figure 3:
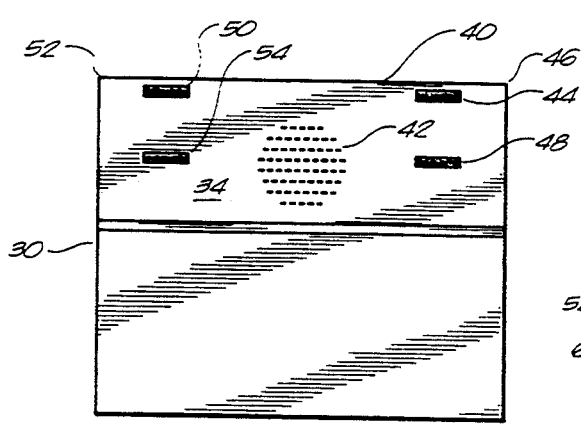
FIG. 3 is a bottom view of the laptop computer showing the position of the hook-and-loop material strips.

FIG. 3 illustrates the bottom view of the laptop computer 30. As can be seen, the laptop computer 30 has a bottom surface 34. Openings 42 are provided in this bottom surface so as to allow the flow of air through the interior of the laptop computer 30 for the purposes of a cooling effect. The present invention incorporates the use of a first strip 44 of hook-and-loop material as positioned adjacent to the back 40 near corner 46 of the laptop computer 30. A parallel strip 48 of hook-and-loop material is positioned in parallel relationship to first strip 44. Strip 48 extends inwardly from the back surface 40 of the laptop computer 30. The distance between strips 44 and 48 should be equal to the linear distance between the ends 18 and 20 of the support device 10. The hook-and-loop material used for strips 44 and 48 are complementary to the hook-and-loop material of strips 22 and 24 of support device 10. As such, the V-shaped member of support device 10 can be received and attached, in a removable fashion, to the bottom surface 34 of laptop computer 30.

Similarly, a second strip 50 of hook-and-loop material is affixed near another corner 52 along the back surface 40 of laptop computer 30. A parallel strip 54 is provided inwardly of strip 50. The arrangement of the strips 50 and 54 should be suitable for receiving the hook-and-loop material of strips 22 and 24 of support device 10. As can be seen, the arrangement of the strips of hook-and-loop material on the bottom surface 34 of laptop computer 30 is suitable for the receipt of a pair of support devices 10. The positioning of a pair of support devices 10 on the bottom surface 34 enhances the stability of the laptop computer 30 during use.

Figure 4:
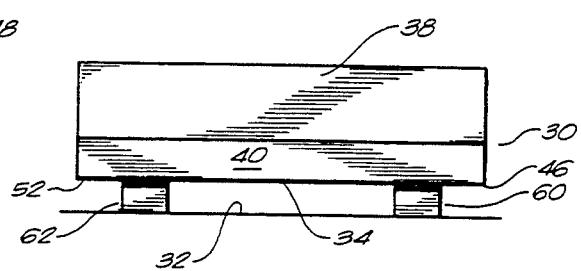
FIG. 4 is an end view of the improved laptop computer of the present invention.

FIG. 4 shows an end view along back surface 40 of laptop computer 30. As can be seen, the screen area 38 extends upwardly for viewing purposes. The first support device 60 is affixed near corner 46 of laptop computer 30. Support device 62 is affixed near corner 52 of laptop computer 30. As can be seen, the positioning of the support devices 60 and 62 along the bottom surface 34 of laptop computer 30 essentially serves to suspend the bottom surface 34 of the laptop computer above the base surface.

Figure 5:
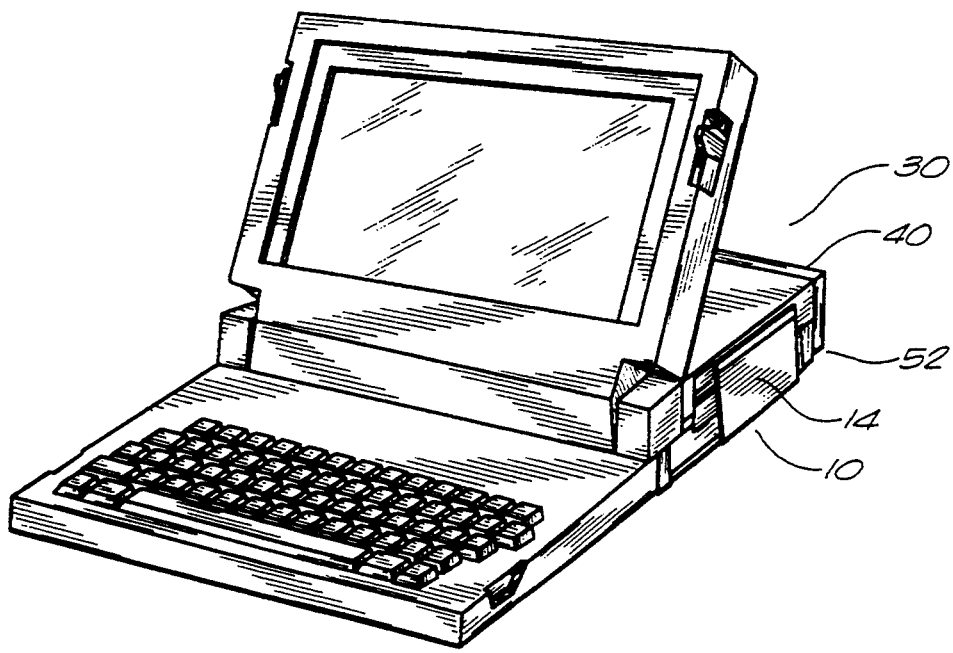
FIG. 5 is a perspective view of the laptop computer of the present invention showing the support device in a stowed position.

FIG. 5 illustrates the laptop computer 30 as having the support device 10 in a properly stowed position. With reference to FIG. 1, it can be seen that VELCRO (TM) strips 22 and 28 extend along the inner surface 26 of panel 12. Similarly, with reference to FIG. 3, it can be seen that the strips 50 and 54 are arranged, in parallel, near the corner 52 at the back surface 40 of laptop computer 30. Because of the configuration and positioning of the strip 28, the strip 28 can be received by the complementary strip 50 when the support device is affixed in the manner shown in FIG. 5. As such, the bottom surface 34 of the laptop computer 30 receives the support device 10 in a properly stowed position. The fact that the panels 12 and 14 are angularly displaced from each other by ninety degrees allows the support device 10 to be properly positioned along the sides (or at the back) of the laptop computer 30. Therefore, during the transport of the laptop computer 30, the support device 10 may be stowed in the manner shown in FIG. 5. Alternatively, the support device 10 can be simply removed from the bottom surface of the laptop computer 30 and placed in any other convenient location in the carrying case for the laptop computer.

Figure 6:
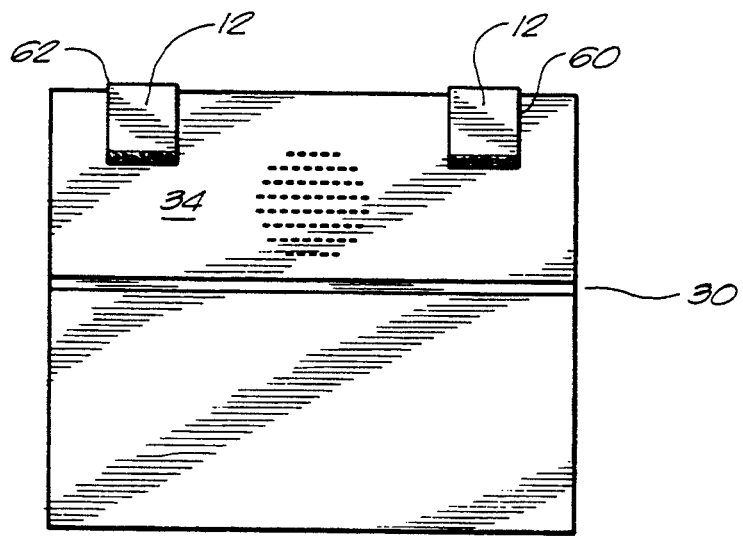
FIG. 6 is a bottom view of a laptop computer showing the support device in a different stowed position.

In FIG. 6, it can be seen how the support devices 60 and 62 can be alternatively positioned for stowage. The first panel 12 of each of the support devices 60 and 62 is positioned in juxtaposition against the bottom surface 34 of the laptop computer 30. The panels 12 are affixed to the complementary VELCRO (TM) strips attached to the bottom surface 30. As such, the panel 14 of the support devices 60 and 62 can extend upwardly along the back of the laptop computer 30 in the manner illustrated in FIG. 5.

The present invention offers significant advantages to the user of the laptop computer. First, and foremost, the configuration of the support device allows the bottom surface of the laptop computer to be angled on the base surface (such as a table). In this manner, the keyboard of the laptop computer is in a more convenient location for use. The screen of the laptop computer is also in a more convenient location for viewing. The positioning of a pair of support devices on the bottom surface of the laptop computer allows the angled positioning of the laptop computer without a loss of stability or support. The positioning of the laptop computer above the base surface allows air to properly flow through the air vents formed on the bottom surface of the laptop computer. This air flow provides a cooling effect to the circuitry of the laptop computer and, ultimately, preserves the life of the computer. The support device is properly configured for stowage along the sides or back of the computer when it is not in use. The rather simple construction of the support device of the present invention is relatively easily manufactured and is comparatively inexpensive. No structural changes to the body of the laptop computer are required for the use of the support device. The support device of the present invention can be employed with any variety of laptop computer that has a flat bottom surface.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A support device for a laptop computer comprising:
   a first panel;
   a second panel connected to the first panel and angularly offset by approximately ninety degrees therefrom, said first panel having an end opposite the connection with said second panel, said second panel having an end opposite the connection with said first panel;
   a first fastening means wrapped around and affixed to said end of said first panel, said first fastening means for removable attachment to a surface of the laptop computer; and
   a second fastening means wrapped around and affixed to said end of said second panel, said second fastening means for removable attachment to said surface of the laptop computer;
   wherein the computer is supported at a convenient angle for usage.

2. The device of claim 1, said first panel being integrally formed with said second panel in a generally V-shaped configuration.

3. The device of claim 1, said first fastening means comprising a first section of hook-and-loop material, said hook-and-loop material for attachment to a complementary section of hook-and-loop material on said surface of the laptop computer.

4. The device of claim 3, said first section of hook-and-loop material being wrapped around said end of said first panel, said second fastening means comprising a second section of hook-and-loop material wrapped around said end of said second panel.

5. The device of claim 3, further comprising:
   a strip of hook-and-loop material affixed to a surface of said first panel adjacent the connection of said first panel with said second panel.

6. The device of claim 1, said first and second panels being of a polymeric material.

7. An improved laptop computer of the type having a generally flat bottom surface, the improvement comprising:
   a first strip of hook-and-loop material affixed to the bottom surface of the laptop computer, said first strip affixed adjacent one corner of the bottom surface;
   a first V-shaped member having a complementary strip of hook-and-loop material affixed to at least one end of said first V-shaped member, said complementary strip removably affixed to said first strip on the bottom surface of the laptop computer, said first V-shaped member extending downwardly therefrom;
   a second strip of hook-and-loop material affixed adjacent to another corner of the bottom surface;
   a second V-shaped member having a complementary strip of hook-and-loop material affixed to at least one end of said second V-shaped member, said complementary strip removably affixed to said second strip on the bottom surface, said second V-shaped member extending downwardly therefrom, said first and second V-shaped members for supporting said bottom surface at an acute angle relative to a base; and
   a parallel strip of hook-and-loop material positioned on the bottom surface of the laptop computer in parallel relationship to said first strip, said first V-shaped member having a second complementary strip of hook-and-loop material affixed to another end of said first V-shaped member, said parallel strip removably attached to said second complementary strip.

8. The improvement of claim 7, said first V-shaped member comprising:
   a first panel; and
   a second panel connected to said first panel, said complementary strip of hook-and-loop material affixed to an end of said first panel.

9. The improvement of claim 8, said first panel being integrally formed with said second panel, said first and second panels being of a polymeric material.

10. The improvement of claim 8, said first panel having an end opposite the connection with said second panel, said complementary strip of hook-and-loop material wrapped over said end.

11. The improvement of claim 10, said second panel having an end opposite the connection with said first panel, said end having a complementary strip of hook-and-loop material wrapped therearound.

12. The improvement of claim 10, said first V-shaped member comprising:
   a complementary strip of hook-and-loop material affixed to an inner surface of said first panel adjacent the connection with said second panel.

13. The improvement of claim 7, said second V-shaped member having a size and configuration identical to that of said first V-shaped member.

14. The improvement of claim 12, said first panel being angularly offset from second panel by approximately ninety degrees.

* * * * *